Figure 1:
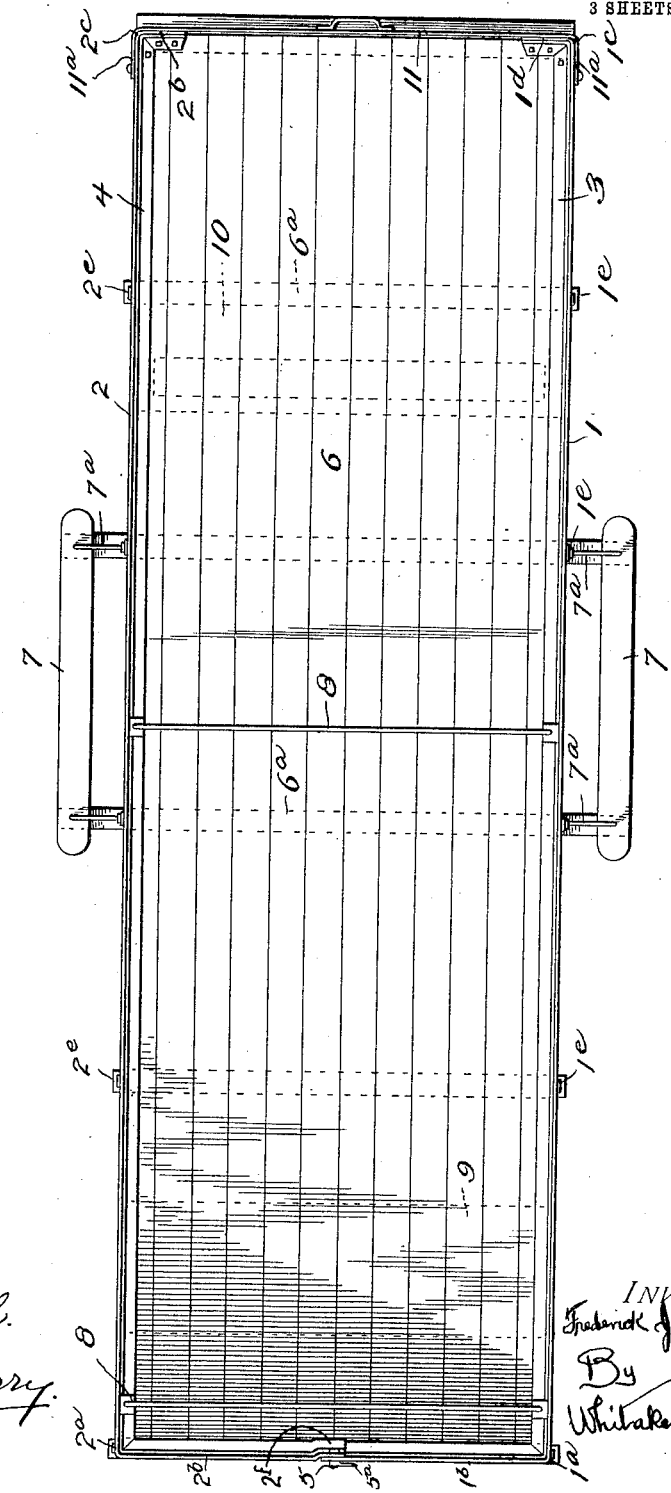

F. J. FARRINGTON.
KNOCKDOWN WAGON BOX.
APPLICATION FILED APR. 24, 1912.

1,089,196.

Patented Mar. 3, 1914.
3 SHEETS—SHEET 1.

WITNESSES:
INVENTOR
Frederick J. Farrington
By
Whitaker & Prevost
Attorneys

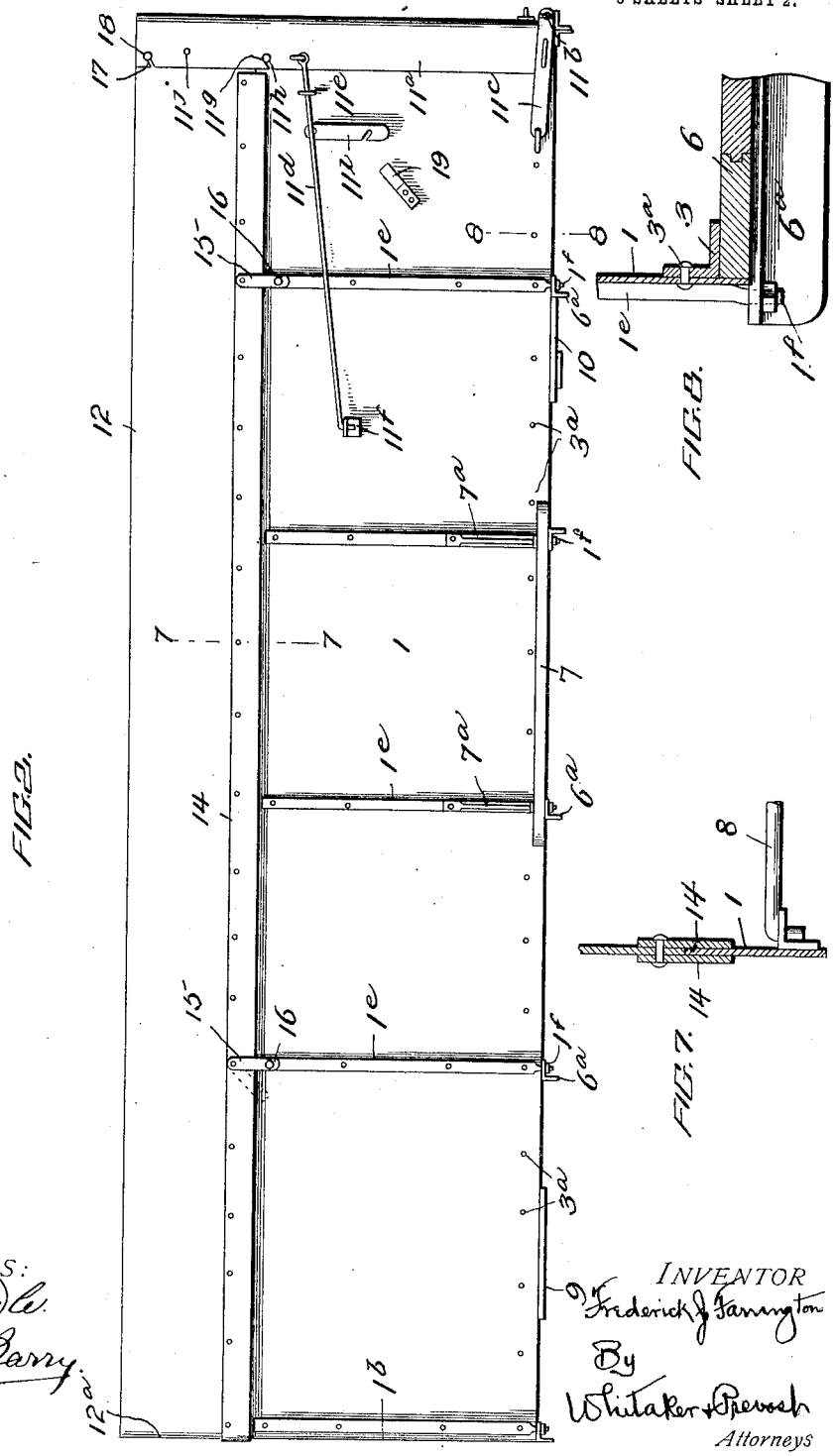

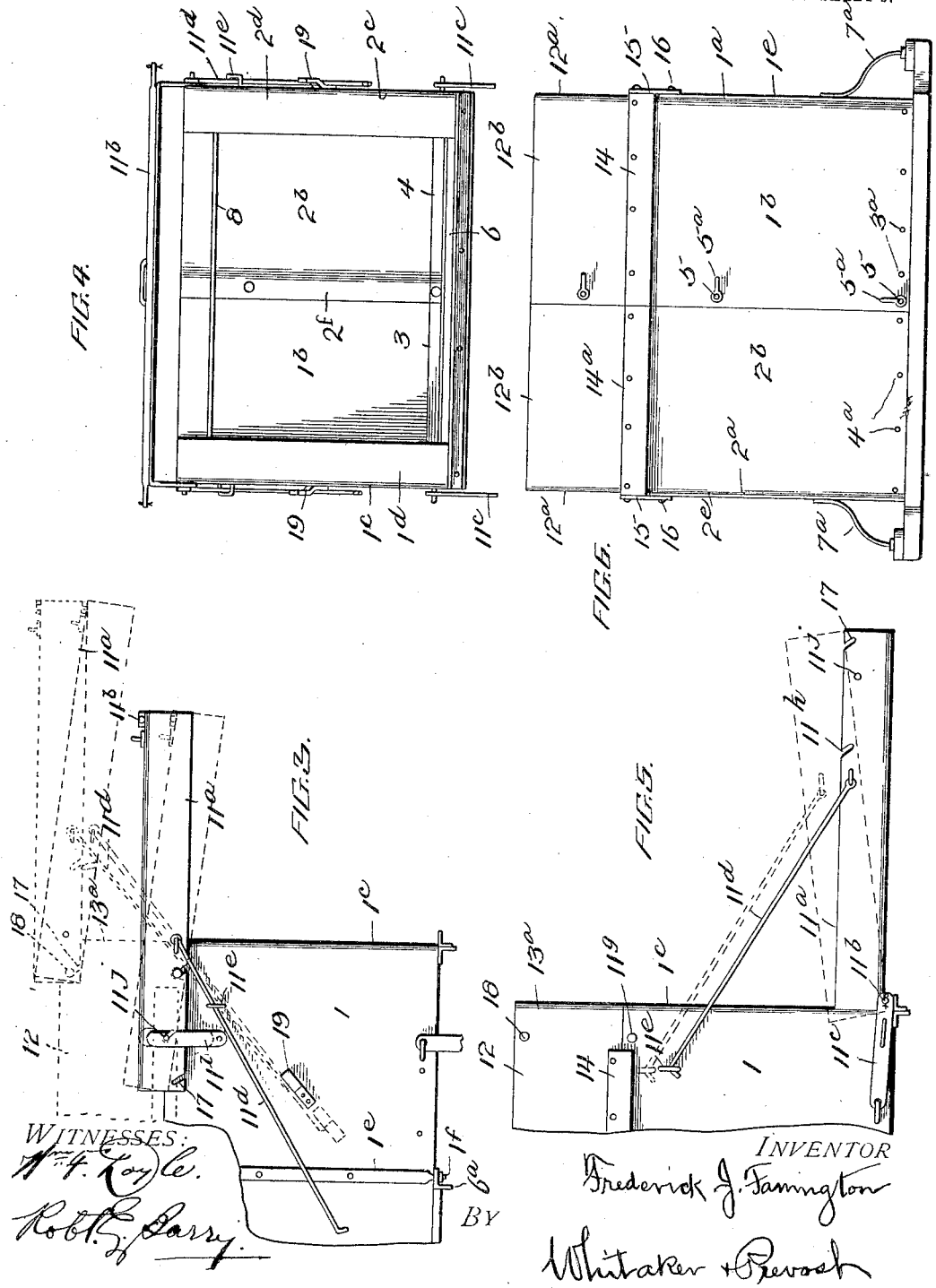

UNITED STATES PATENT OFFICE.

FREDERICK J. FARRINGTON, OF OMAHA, NEBRASKA.

KNOCKDOWN WAGON-BOX.

1,089,196.   Specification of Letters Patent.   Patented Mar. 3, 1914.

Application filed April 24, 1912. Serial No. 692,899.

*To all whom it may concern:*

Be it known that I, FREDERICK J. FARRINGTON, citizen of the United States, residing at Omaha, in the county of Douglas and State of Nebraska, have invented certain new and useful Improvements in Knockdown Wagon-Boxes; and I do hereby declare the following to be a full, clear, and exact description of the invention, such as will enable others skilled in the art to which it appertains to make and use the same.

My invention consists in certain new and useful improvements in knock down wagon boxes, more especially adapted for use in hauling grain and is constructed preferably with metal instead of wooden sides, and is so formed that there are no joints or openings in the corners through which grain or other material being hauled, may escape.

I contemplate making the main portions of my improved wagon box of steel or other suitable metal, whereby the cost is reduced to a minimum and the box made to withstand the most severe usage and to wear for a longer period than the ordinary wagon box. The metal sides will not check, warp, split or break, and in addition, the box may be readily taken apart and the sections so packed as to occupy comparatively little space in shipment to different points.

A further important feature lies in my improved form of rear end gate, which is constructed and mounted so as to answer the dual purpose of dump end gate and shoveling board.

With these objects in view, my invention consists of the details of construction set forth in the following description and illustrated in the accompanying drawings.

In the drawings, Figure 1 is a top plan view of my improved wagon box. Fig. 2 is a side elevation of the same with the addition of supplemental sides and end gate fastening. Fig. 3 is a side view of the rear end of the wagon box showing the manner of securing the end gate when used in dumping, the dotted lines showing the manner of securing the same when the supplemental sides are used. Fig. 4 is a rear view of the wagon box showing the end gate in its raised position. Fig. 5 is a partial side view of the rear of the wagon box, illustrating the manner of securing the end gate when employed as a shoveling board. Fig. 6 is a front elevation of the wagon box. Fig. 7 is a vertical sectional view on line 7—7 of Fig. 2. Fig. 8 is a sectional view on line 8—8 of Fig. 2.

The wagon body is preferably constructed in the following manner, although modifications may be made without departing from the spirit of the invention.

1 and 2 are the main sides of the wagon body and are made preferably of suitable sheet metal. The side 1 is curved or bent at $1^a$ forming an angularly disposed extension $1^b$ at one end and at its opposite end is bent at $1^c$ thus providing a shorter extension $1^d$. The side 2 is similarly formed, being bent at $2^a$ and $2^c$ forming extensions $2^b$ and $2^d$, the said extension $2^b$ forming with the extension $1^b$ the front of the wagon box, when joined together, as shown in Fig. 1. The front extension $2^b$ is also provided with an inwardly extending portion $2^f$, which is adapted to embrace the end of the extension $1^b$ to form a smooth joint. The side 1 is also provided with a plurality of vertical braces $1^e$, $1^e$ which are preferably formed of metal and are secured to the side 1 in any well known manner. Screw threaded portions $1^f$, $1^f$ are formed upon said vertical braces at the lower ends thereof for a purpose hereinafter specified. An angle iron 3 is secured by means of rivets $3^a$, $3^a$ to the side 1 and to said front and rear extensions $1^b$ and $1^c$. The side 2 is provided with vertical braces $2^e$, $2^e$ similar to those used on side 1. The side 2 has also secured thereto by means of rivets $4^a$, $4^a$ an angle iron 4. The front extension $1^b$, and the portion $2^f$ are provided with apertures through which bolts 5, 5 are adapted to be passed and secured by means of the handle nuts $5^a$, $5^a$. This fastening connects said extensions $1^b$ and $2^b$ but other fastenings may be used if desired.

The bottom 6 of my wagon box is preferably made of boards, tongued, grooved and matched. These boards preferably run lengthwise of the box, are sufficient in number to form the entire bottom of the same and are secured by means of screws extending up through the horizontal angle iron braces $6^a$, $6^a$ which run crosswise of the box at different points.

In assembling the wagon box, the side pieces 1 and 2 are placed upon the bottom 6 in such manner that the angle bars 3 and 4 will rest upon the top surface of said bottom, as best illustrated in Fig. 8. The screw threaded portions of the vertical side braces 1ᵉ, 1ᵉ pass through apertures in the angle iron braces 6ᵃ, 6ᵃ and are secured by means of nuts. By this construction the sides and bottom are joined in such manner as to secure a tight joint. It will also be seen that the sides 1 and 2 extend below said bottom a sufficient distance to protect the edges of the same from rain, moisture, dirt, etc. The downward extensions also prevent warping, splitting or breaking of the floor edges, and assist in making the joint grain tight. The two center angle iron braces 6ᵃ, 6ᵃ are made of greater length than the rest of said braces and carry upon their outer ends, foot boards 7. These foot boards are preferably made of wood and are secured upon said angle iron braces 6ᵃ, 6ᵃ by means of curved braces 7ᵃ, 7ᵃ having screw threaded portions which are engaged by nuts. Additional reinforcing bars 8, 8 are detachably secured on the interior of said box.

Reinforcing strips 9 and 10 extend the full width of the bottom 6 and are secured to the same. These strips are placed at such a distance from the front and rear of the box as to be directly over the bolster of the wagon, and prevent the bolster from rubbing the bottom of the wagon box, thereby preventing wear upon the bottom boards or chafing the sides of the box. They also prevent the box from sliding forward or backward upon the wagon bolster. The rear end of said wagon box is provided with an end gate 11. Said end gate is provided with extensions 11ᵃ, 11ᵃ which project upon the sides 1 and 2 when the gate is closed and assist in making the rear end of the wagon body grain tight. This rear end gate is preferably made of thicker metal than the metal plates used for the sides and front end, as it must be capable of standing severe usage.

The rear end gate is detachably secured to the bottom by means of the rod 11ᵇ which engages apertures in loosely mounted straps 11ᶜ, 11ᶜ and is locked by means of cotter pins. The rear end gate 11 is secured in a closed position by rods 11ᵈ, 11ᵈ which slide in guides 11ᵉ, 11ᵉ. The rear ends of said rods 11ᵈ are adapted to engage apertures in lugs 11ᶠ and hold said gate in position. Additional securing means are provided by the pins 11ᵍ, 11ᵍ and the slots 11ʰ, 11ʰ, the operation of which is obvious and needs no explanation.

When it is desired to use the rear gate 11 as a shoveling board the slots 11ʰ are raised from the pins 11ᵍ and the rods 11ᵈ are disengaged from the lugs 11ᶠ, 11ᶠ. The bent ends of the rods 11ᵈ, 11ᵈ then engage the guides 11ᵉ and hold the end gate in the shovel board position as shown in Fig. 5. To use the rear gate 11 as a dump end gate, supposing the same to be in its closed position, as shown in Fig. 2, the cotter pins are taken from the rod 11ᵇ and the straps 11ᶜ, 11ᶜ removed. This allows the gate 11 to be pivoted upon the pins 11ᵍ, 11ᵍ. After removing the rods 11ᵈ, 11ᵈ from the lugs 11ᶠ, 11ᶠ, the bottom of the end gate 11 is swung outwardly and upwardly to the position shown in full lines in Fig. 3, where it is secured by means of the hooks 11ⁱ, 11ⁱ, which engage the pins 11ʲ, 11ʲ upon the extensions 11ᵃ. The rear end gate may be held on a slant in its different open positions by a slight change of parts as illustrated in dotted lines in Figs. 3 and 5.

When it is desired, supplemental sides 12 may be used to facilitate the hauling of a larger load. These supplemental sides are bent at 12ᵃ and have extensions 12ᵇ, 12ᵇ which are detachably connected and form the supplemental front. These supplemental sides are also bent at 13ᵃ and have extensions (not shown) of the same width as the extensions 1ᵈ and 2ᵈ of the sides 1 and 2. The top boards 12 have riveted thereto a plurality of metal strips 14 and 14ᵃ which are secured to said boards in such manner as to form a recess. As shown in Fig. 7 the sides 1 and 2 are adapted to engage said recesses and act to hold the top boards in place. Hooks 15 which engage pins 16, hold the top boards and sides together. It is obvious that by this construction, the joint between the sides and top boards, is made grain tight. To use the end gate 11 as a dumping gate, when the top boards are in place, practically the same procedure is followed, as when the top boards are absent. The upper inclined slots 17 are engaged by the pins 18 on the top boards, said pins acting as pivots on which the gate swings and the latter is secured in its adjusted position by the rods 11ᵈ, the lower ends of which engage securing stops 19 as illustrated in dotted lines in Fig. 3.

It is obvious from the foregoing that the construction shown and described is the preferable one although such construction may be varied as to detail and material used, without departing from the spirit of my invention.

What I claim and desire to secure by Letters Patent is:—

1. A knock-down wagon box comprising two side pieces constructed of suitable material, said side pieces being provided with extensions at an angle thereto and integral therewith, the meeting ends of said extensions being provided with apertures, bolts adapted to pass through said apertures, tail nuts for securing said bolts, and a bottom detachably secured to said sides.

2. A knock-down wagon box comprising two side pieces constructed of suitable material, said side pieces being provided with front and rear extensions at an angle thereto and integral therewith, the end of the front extension of one side being provided with an inwardly bent portion which is adapted to embrace the end of the front extension of the other side, means for detachably securing said ends together, and a bottom detachably secured to said sides.

3. A knock-down wagon box comprising two side pieces constructed of suitable material, said side pieces being provided with front and rear extensions at an angle thereto and integral therewith, the end of the front extension of one side being provided with an inwardly bent portion which is adapted to embrace the end of the front extension of the other side, means for detachably securing said ends together, the rear extensions forming a portion of the rear end of the box with an open space between, means for closing the space between the rear extensions, and a bottom detachably secured to said sides.

4. A knock-down wagon box comprising two side pieces constructed of suitable material, said side pieces being provided with front and rear extensions at an angle thereto and integral therewith, the end of the front extension of one side being provided with an inwardly bent portion which is adapted to embrace the end of the front extension of the other side, apertures provided in said ends, bolts passing through said apertures, tail nuts for securing said bolts, and a bottom detachably secured to said sides.

5. A wagon box comprising two side pieces constructed of suitable material, said side pieces being provided with front and rear extensions at an angle thereto and integral therewith, the meeting ends of the front extensions being detachably secured together to form the front end of the box, and the rear extensions forming a portion of the rear end of the box, angle irons extending lengthwise of said sides and upon said extensions, a bottom detachably secured to said sides, the angle irons being adapted to abut against said bottom, and means for closing the space between the rear extensions.

6. A wagon box comprising two main side pieces constructed of suitable material, said side pieces being provided with front and rear extensions at an angle thereto, the meeting ends of the front extensions being secured together to form the front end of the box and the rear extensions forming a portion of the rear end of said box with an open space between, a bottom detachably secured to said main sides, supplemental sides provided with angular extensions, recesses formed at the bottoms of said supplemental sides and their extensions, said recesses being adapted to engage the top of said main sides and their extensions, and means for closing the space between the rear extensions.

7. A wagon box comprising two main side pieces constructed of suitable material, said side pieces being provided with front and rear extensions at an angle thereto, angle irons extending along the lower edges of said main sides and their extensions, a bottom secured to said main sides, the angle irons being adapted to rest snugly upon the upper surface of said bottom, supplemental sides detachably secured to said main sides, and means for closing the space between the rear extensions.

In testimony whereof I affix my signature, in the presence of two witnesses.

FREDERICK J. FARRINGTON.

Witnesses:
J. A. ELLETT,
A. H. VANCAMP.

Copies of this patent may be obtained for five cents each, by addressing the "Commissioner of Patents, Washington, D. C."